United States Patent [19]
Billson

[11] 3,737,960
[45] June 12, 1973

[54] REFLECTOR ALIGNMENT APPARATUS
[75] Inventor: John A. Billson, Willoughby, Ohio
[73] Assignee: General Electric Company, Schenectady, N.Y.
[22] Filed: Dec. 29, 1971
[21] Appl. No.: 213,291

[52] U.S. Cl. .................. 29/25.15, 316/23, 316/29, 29/25.19
[51] Int. Cl. ............................................. H01j 9/18
[58] Field of Search .............................. 316/23, 29; 29/25.15, 29.19, 25.2

[56] References Cited
UNITED STATES PATENTS
1,241,512  10/1917  Harrington ............................ 316/29
2,317,031  4/1943  Cotman et al. ..................... 29/25.15
2,644,100  12/1945  Braunsdorff ....................... 29/25.15
2,824,356  2/1958  Geissbuhler ......................... 29/25.2
3,550,227  12/1970  Weigel et al. ...................... 29/25.19

Primary Examiner—Lowell A. Larson
Attorney—Emil F. Sos, Jr. and Henry P. Truesdell

[57] ABSTRACT

An apparatus for accurately aligning and attaching a lamp to support wires to form a mount and positioning and attaching the mount in metal thimbles of a reflector section comprising an adjustable lamp holder, a support wire holder, an optical apparatus for aligning the lamp's light source, an attaching device for forming a mount and a fixture for positioning the mount at the optical focus of the reflector and attaching the support wires to thimbles embedded in the reflector.

9 Claims, 10 Drawing Figures

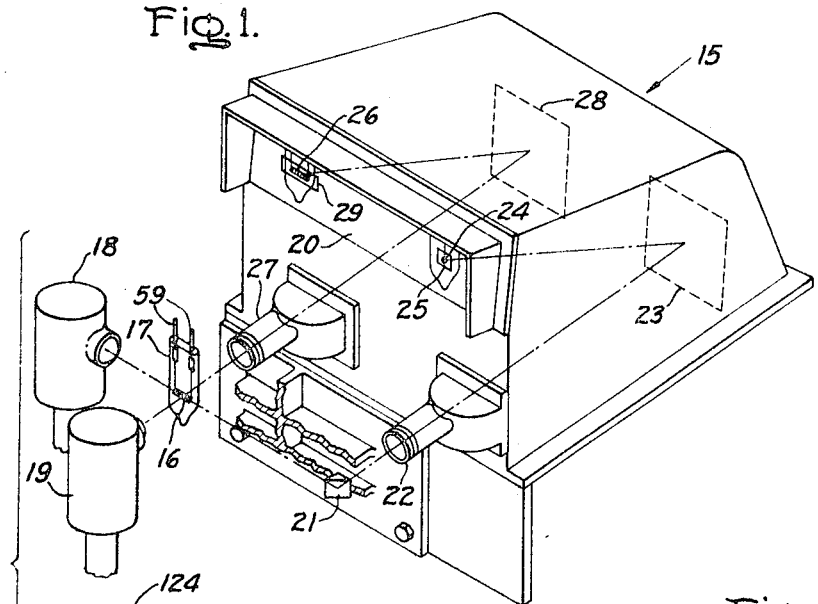
Fig. 1.
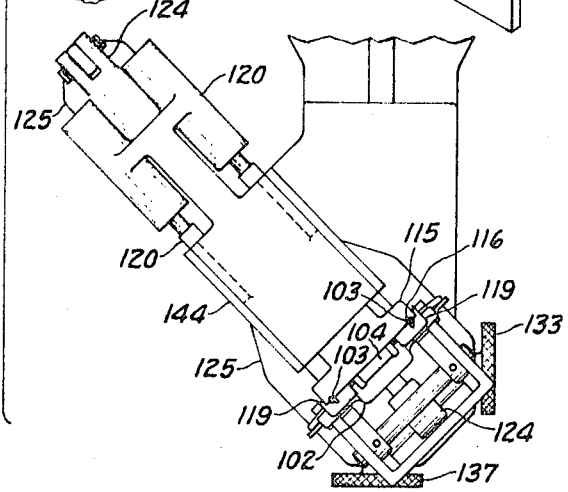
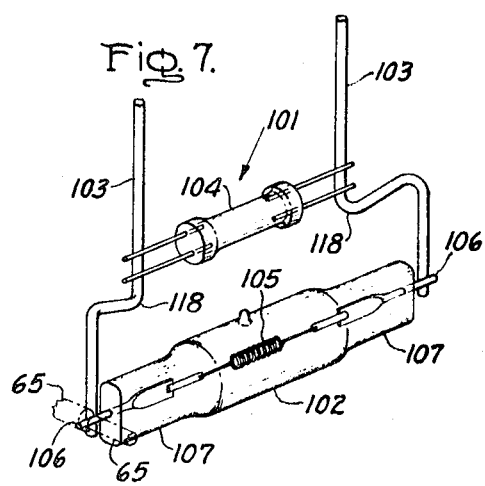
Fig. 7.
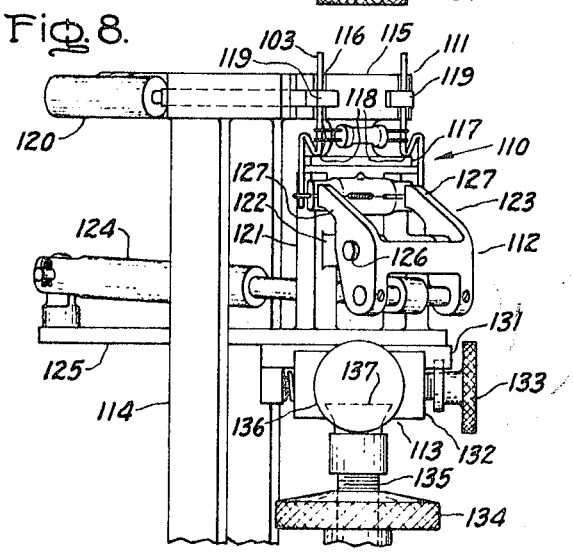
Fig. 8.
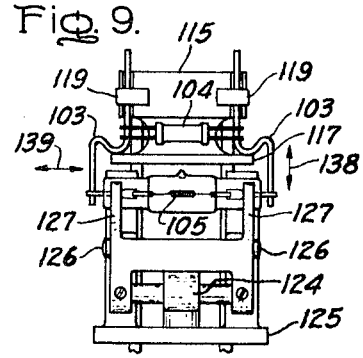
Fig. 9.
Inventor:
John A. Billson
by Emil X. Soo, Jr.
His Attorney

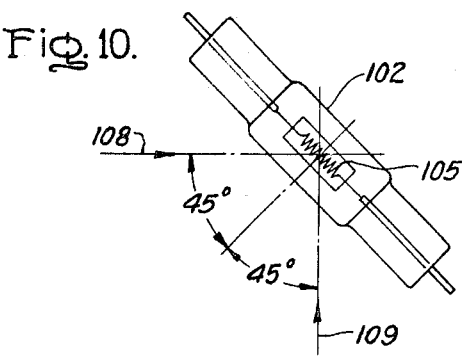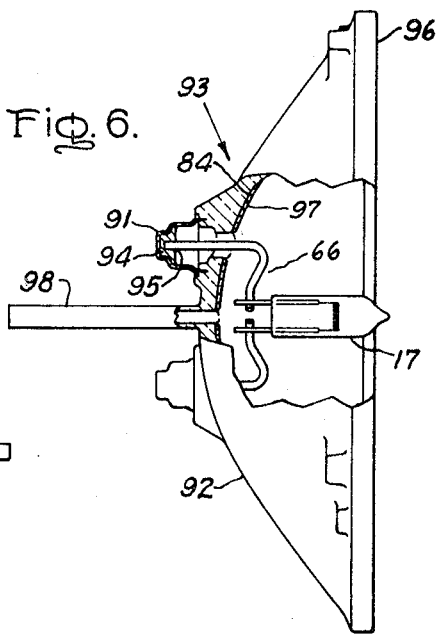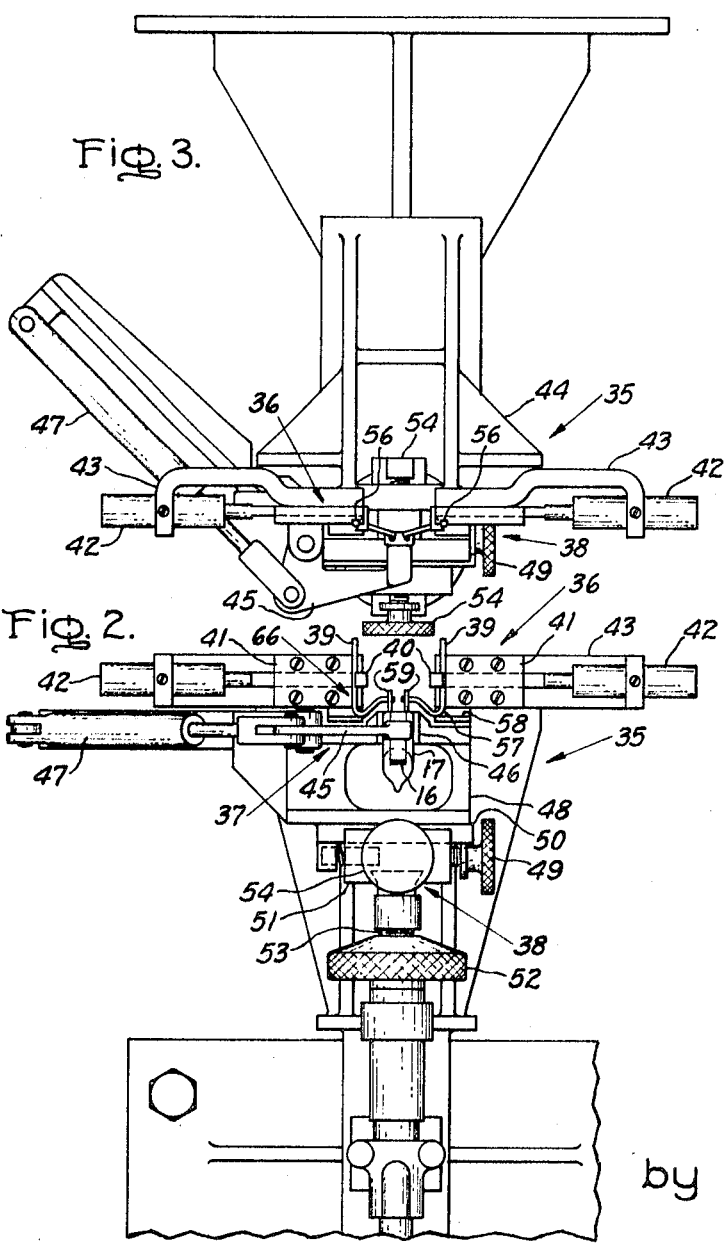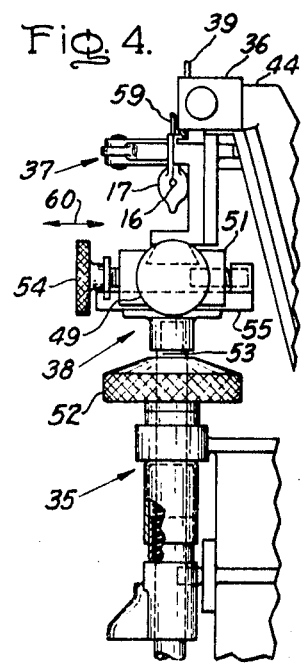

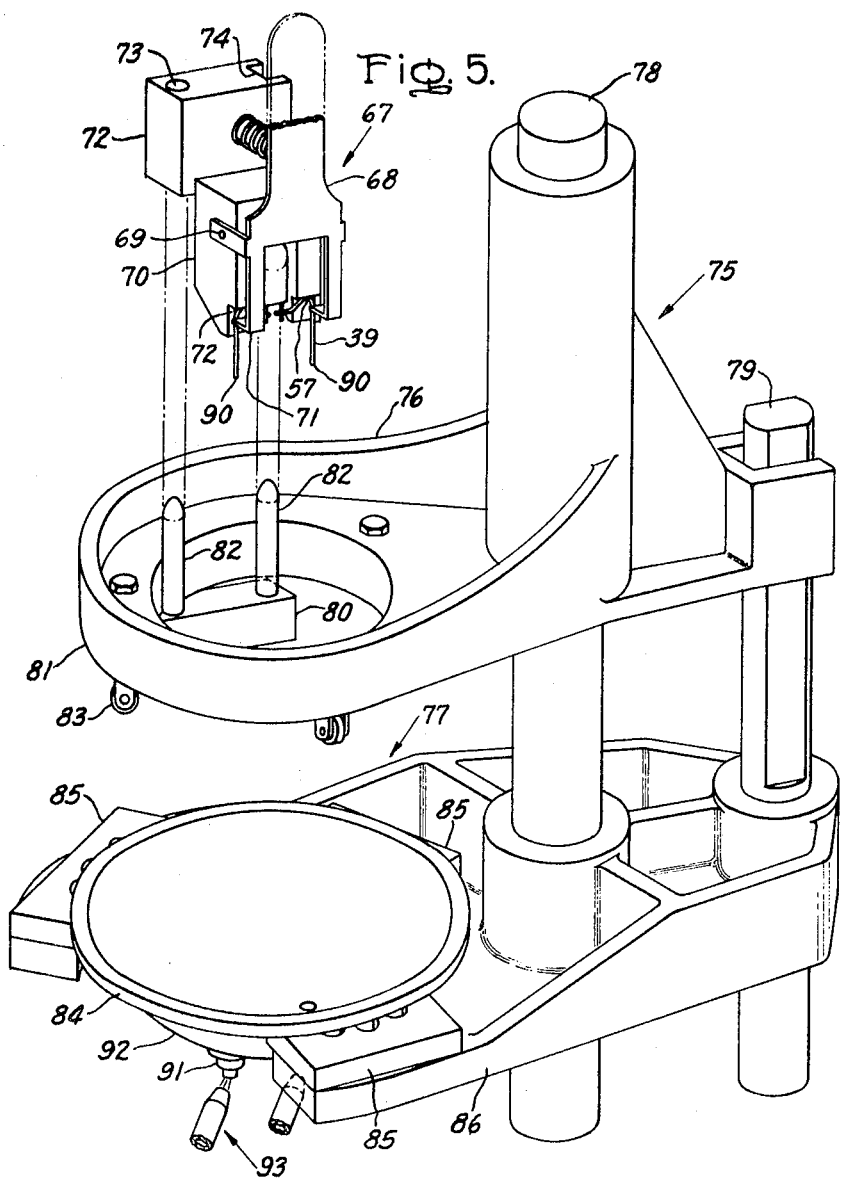

REFLECTOR ALIGNMENT APPARATUS

BACKGROUND OF THE INVENTION

1. Field of the Invention

The invention relates to apparatus for the assembly of electric lamps and similar devices. More particularly, it relates to assembly apparatus for the accurate alignment of an electric lamp in a reflector.

2. Description of the Prior Art

In reflector lamps having a parabolic or ellipsoidal reflector, it is very important to locate the light source at the reflector's focal point for maximum efficiency. In the well known sealed beam auto lamps, alignment of the filament is accomplished by using an apparatus such as is more fully described in Geissbuhler U.S. Pat. No. 2,824,356.

With the introduction of the regenerative cycle or tungsten-halogen lamp, it became desirable to use a sealed tungsten-halogen lamp as the light source in the reflector so as to derive the high efficiencies associated with the halogen cycle. Mounting and aligning a sealed envelope light source presented different problems than mounting a flexible filament wire.

The rigid lamp, as opposed to a flexible filament, would have to be mounted on supports which in turn were attached to ferrules in a reflector surface. In order to properly align the light source inside the envelope with the reflector section, the support wires would have to be bent in at least one direction until the light source was at the reflector's optical focus. This bending introduced stresses in the assembly and the support wires would have a tendency to return to their original location thereby creating an out of focus condition between the light source and the reflector.

SUMMARY OF THE INVENTION

It is, therefore, an object of the invention to provide an apparatus for accurate alignment and assembly of lamps within reflectors. A further object of the invention is the elimination of stresses in the support wires by using prebent leads which accurately align the light source with respect to certain predetermined points on the support wires prior to attaching the lamp leads to the support wires and prior to attaching the support wires to the reflector.

Briefly stated, in accordance with one aspect of the invention, prebent support wires are placed in a fixture in which they are rigidly held as to two directions and can rotate or pivot around a bent portion of the supports in the third direction. The lamp containing the light source is loaded in a fixture and the lamp leads are brought into contact with the bent support wires through the use of a directional slide adjustment device.

An optical device, which is in predetermined relationship to two points on the support fixture, projects an image of the lamp's light source on a screen which contains predetermined locations in which the image should fall.

By further manipulating the dimensional adjusting device, the lamp is moved up or down and right or left against the support wires. Since the support wires can rotate with respect to the in and out direction, the lead wires of the lamp remain in contact with the supports until the light source is aligned with respect to the screen pattern and in turn with respect to the two points on the support wire.

According to a further aspect of the invention, the lamp lead wires are attached to the support to form a lamp mount, by welding for example. This mount is then transferred to a fixture which references from the same two areas on each support used in the alignment operation. The fixture containing the mount is transferred to a reflector holding fixture which receives the mount and using the same two reference areas aligns the supports and in turn the light source with the optical focus of the reflector section. Following alignment with the reflector, the ends of the supports which are positioned inside the ferrules are attached thereto by brazing, for example.

BRIEF DESCRIPTION OF THE DRAWINGS

In the drawings:

FIG. 1 is a perspective view of the lamp and support wire holders and the optical apparatus of the invention;

FIG. 2 is a front elevation of the apparatus used to adjust a single-ended lamp;

FIG. 3 is a plan view of the adjusting device used for a single-ended lamp;

FIG. 4 is a side elevation of the adjusting apparatus shown in FIGS. 2 and 3;

FIG. 5 is a perspective view of the apparatus used to align the lamp mount with the optical focus of the reflector;

FIG. 6 is an elevation partially in section showing a single-ended lamp attached to and positioned in a reflector;

FIG. 7 is a perspective view of a mount having a double-ended lamp;

FIG. 8 is a perspective view of the lamp and support holder along with the three-dimensional adjusting device; and FIG. 9 is a front elevation of the lamp and support holders of the invention.

FIG. 10, is an elevation of a double-ended lamp in relation to the optical apparatus of the invention.

DESCRIPTION OF THE PREFERRED EMBODIMENTS

As shown in FIG. 1 of the drawings, an optical device 15 is used to align a light source 16 of a single-ended lamp 17. Two projection lamps 18 and 19 direct beams of light, at a 90° angle to each other, to create an image of the light source 16 on screen 20. The rays of projection lamp 18 pass through the narrow view of light source 16 into prism 21, lens 22 and reflector 23 which casts a view image 24 on screen 20. Area 25 of screen 20 represents a predetermined position within which the narrow view image must fall before the light source is in alignment as to one of three directions. Adjustments to the position of lamp 17 to get the narrow view image of the light source in area 25 will be described shortly.

Projection lamp 19 casts its rays upon light source 16 to create long view image 26. The rays of lamp 19 proceed through lens 27 onto reflector 28 and then screen 20. The long view image 26 must similarly fall within a predetermined area 29 of the screen in order to be accurately aligned in another of three directions.

Referring now to FIGS. 2, 3 and 4 of the drawings, single-ended lamp 17 is held in mounting head 35. The mounting head 35 has a support wire holder 36, a lamp holder 37 and a three directional slide adjusting device 38. Support wires 39 are held in holder 36 by jaws 40 and block 41. The jaws are moved into position by the action of air cylinders 42. Blocks 41 and air cylinders 42 are attached to member 43 which in turn is attached to frame member 44.

Lampholder 37 has an arm 45 to press lamp 17 against plate 46 and hold it securely in place for the mount forming operation. Arm 45 is operated through the action of air cylinder 47. Plate 46, arm 45 and air cylinder 47 are secured to housing 48 which is attached to slide member 38.

Movement of lampholder 37 in a back and forth direction (left--right in the showing of FIG. 2) is accomplished by turning knurled knob 49. The turning of knob 49 moves slide 50 in ways in body 51. Knurled wheel 52 and spindle 53 move lampholder 37 in the up and down direction of FIG. 2. As can best be seen in FIG. 4 of the drawing, knurled knob 54 moves block 51 relative to plate 55 in directions shown by the arrow 60.

In order to operate lamp mounting head 35, support wires 39 are placed in grooves 56 in block 41. See FIG. 3. A part of the bend 57 of the support wire is rested on flat surface 58 also part of block 41 and perpendicular to grooves 56. Air cylinder 42 is then actuated to bring jaws 40 against support wires 39 and hold them firmly in grooves 56. Up and down movement of the lead is prevented because bend 57 is resting on plate 58. Lamp 17 is then placed against plate 46 and arm 45 presses the lamp firmly against the plate by activating air cylinder 47.

With the lamp and support wires firmly in place, knurled knob 54 is turned until lamp lead wires 59 contact support wires 39. Because of bend 57 in support wire 39, the support wires can pivot around bend 57 on plate 58 until both lamp lead wires contact both support wires. As was the case in the prior art, either lead wire or support wire would have had to be bent into position when the opposite lead wire and support wire contacted each other. This bending into position, as opposed to the rotational pivoting of the invention, induced stresses into the final mount structure which led to an out of focus condition in the finished lamp reflector assembly.

Once the lamp leads and support wires are in contact, wheel 52 is turned to move lampholder 37 and in turn lamp 17 up and down until the long view image 26 of light source 16, FIG. 1, is within the screen area 29. When the long view image is within the screen area, the light source 16 is accurately aligned, as to the up and down direction, with respect to support wires 39. The light source is now aligned with respect to support wires in two of three directions.

Knurled knob 49 is then turned to move light source 16 left or right in order to get narrow view image 24 into screen area 25 of optical device 15, FIG. 1. When this alignment has been achieved, the light source 16 is aligned with support wires 39 in all three directions. With the source aligned, the lead wires 59 are ready for attachment to support wires 39. Welding electrodes 65, FIG. 7, of welding apparatus, not shown, are brought into contact with the lead and support wires to attach them in their accurately aligned position. Both air cylinders 42 and 47 are deactivated and lamp mount 66 is ready to be loaded into mount holding fixture 67 illustrated in FIG. 5.

Mount holding fixture 67 has a spring-tensioned arm 68 which pivots about pin 69 in body 70. Arm 68 has fingers 71 to hold support wires in predetermined locations similar to the holding action of jaws 40 of support wire holder 36. Bend 57 in each support wire rests against notch 72 in body 70 in a manner similar to the bend's contact with plate 58. By holding the lamp mount 66 in these two areas, the alignment accomplished in mounting head 35 of light source 16 is maintained in fixture 67. Attached to body 70 of mount holding fixture 67, is block 72 containing a hole 73 and a slot 74 for locating with the reflector alignment fixture 75. The reflector alignment fixture 75 has a centering ring 76 and a locating ring 77 attached to shaft 78. Guide post 79 prevents rotation of centering ring 76. Centering ring 76 has a block 80 attached to housing 81 which has locating shafts 82 to mate with hole 73 and slot 74. On the under side of housing 81 are three wheels or rollers 83 to align the mount 66 with reflector surface 84.

In operation, mount 66 is loaded into holding fixture 67 and held in predetermined location with respect to slot 74 and hole 73. This means that light source 16 is in an accurate predetermined location with the slot and the hole of the fixture. The mount holding fixture 67 is then positioned on block 80 by sliding hole 73 and slot 74 onto shafts 82.

Light source 16 is now accurately positioned with respect to centering ring 76. Locating ring 77 is attached to both shafts 78 and post 79 to maintain proper alignment with centering ring 76. Locating ring 77 also has three centering pads 85 secured to base plate 86 for holding the reflector section in predetermined location. The centering ring 76 is lowered along shaft 78 until rollers 83 make contact with reflector surface 84. As the centering ring is brought down over the locating ring, outer ends 90 of support wires 39 are inserted in the thimble-like terminal 91 embedded in reflector 92. Pressure of the rollers 83 on reflector surface 84 will slightly tip or adjust the reflector on the three centering pads 85 so that the light source is aligned with the optical focus of the reflector surface.

Once the light source has been positioned at the optical focus, brazing material is inserted into thimbles 91 and burners 93 apply heat to the thimbles to form a brazed connection between the outer ends 90 of support wires 39 and thimbles 91.

FIG. 6 shows the completed reflector lamp 93 made by attaching lamp mount 66 to the thimble-like terminals 91. Brazing material 94, previously referred to, has formed a brazed connection as shown at 95. A glass cover section, not shown, may be sealed to the reflector section edge 96 to form the well-known sealed beam auto headlight or other reflective lamp. Reflector section 92 has an exhaust tube 98 which is used to fill the sealed refelctor lamp with an inert gas to protect the reflective coating 97 on the reflector surface 84. Another embodiment of the invention is illustrated in FIGS. 1, 7, 8 and 9. Referring now to FIG. 7, a lamp mount 101 has component parts such as double-ended lamp 102, support wires 103, and bridge 104. Double-ended lamp 102 has a light source 105 attached to lead wires 106 sealed in stem presses 107.

Light source 105 must be aligned in optical apparatus 15 of FIG. 1 by creating images on screen 20 which fall into predetermined screen areas similar to areas 25 and 29 used for the single-ended lamp 17. However, unlike single-ended lamp 17, a noarrow view image of light source 105 is unobtainable because the pinch seals 107 and lead wires 106 block the narrow view of light source 105. Accordingly, the locations of the projection lamps 18 and 19 are adjusted, as shown in FIG. 10, until the light source 105 is at a 45° angle with each beam of light 108, 109 from projection lamps 18 and 19 of FIG. 1. The images of source 105 on screen 20 are neither long nor narrow but an average view of the long view of the coil at 45° angles. Mounting head 110, FIGS. 1, 8 and 9, shows the approximate position of lamp 102 as the two projection lamps create the 45° images on screen 20.

Referring now to FIG. 8, mounting head 110 is made up of support wire holder 111, lampholder 112, slide adjusting device 113, and frame 114. Support wire holder 111 has a holding block 115 with grooves 116 for receiving support wires 103 and a plate 117 upon which bend 118 of support wire 103 rests. Jaws 119 hold the support wire firmly in place through the force created by air cylinders 120. The air cylinders and holding block are attached to frame 114.

Lampholder 112 is made up of upright holder 121, pivot arm 122, finger assembly 123, air cylinder 124, and plate 125 for supporting these elements. The entire lamphold-ing assembly is attached to slide adjuster 113 through slide 131 which moves in ways in body 132 when knurled knob 133 is turned. Knurled wheel 134 and spindle 135 move lampholder 112 in an up and down direction as indicated by arrow 138 in FIG. 9. Knurled knob 136 moves body portion 132 relative to plate 137 in a direction indicated by arrow 139 in FIG. 9.

In operation, support wires 103 are first loaded into holder 111 by placing the wires in grooves 116 and by positioning the support wire bends on plate 117. Air cylinders 120 are then actuated to move jaws 119 toward holding block 115 thereby firmly clamping the support wires. As previously indicated, support wire bend 118 is resting or in contact with plate 117 and therefore cannot move in the up or down direction shown by arrow 138. The jaws and grooves hold the support wires secure against any lateral movement in the direction indicated by arrow 139.

After the lead wires are positioned in holder 111, the double-ended lamp 102 is placed on upright holder 121. Air cylinder 124 is activated to pivot finger assembly 123 about pin 126 which is pinned in arm 122 thereby causing fingers 127 to contact the lamp stem presses 107 and firmly hold the lamp against holder 121.

With the support wires and lamp in their respective holders, knurled knob 137 is turned until lead wires 106 make contact with support wires 103. As the knob is turned and a single lead wire contacts a support wire, the support wire assembly rotates about bend 118 until both lead wires make contact with both support wires. The rotation of the support wires about the bend allows alignment in one direction without the stress-inducing-bending of the prior art as previously described.

The lamp and support wires are now ready for optical alignment. Knurled wheel 134 is turned to move lamp leads 106 relative to support wires 103 in the direction indicated by arrow 138 of FIG. 9. The wheel is turned until the 45° image of light source 105 is within the predetermined screen area similar to area 29 of FIG. 1. Following this adjustment, knurled knob 133 is turned to move lead wires 106 relative to support wires 103 in the direction indicated by arrow 139. Knob 133 is turned until the 45° image of light source 105 falls within a screen area similar to area 25 of FIG. 1. The light source is now accurately aligned with respect to the support wires and welding electrodes 65, FIG. 7 are brought into contact with the leads and supports, to weld the two components to make double-ended lamp mount 140. Insulating bridge 104 is then attached to the support wires at two locations on each support to prevent movement of the wires in respect to each other.

Double-ended lamp mount 140 is then placed in a fixture similar to fixture 67 shown in FIG. 5. The mount is then aligned with the optical focus of reflector 92 and the outer ends of the support wires are brazed to the thimble-like terminals on the reflector to form a projector type lamp in the manner previously described.

What I claim as new and desire to secure by Letters Patent of the United States is:

1. An apparatus for aligning a lamp mount having support wires with the optical focus of a reflector section and attaching the lamp mount to thimble-like terminals embedded in the reflector section comprising:
   a. a mounting head comprising a fixed support wire holder and an adjustable lampholder for holding a lamp with lead wires,
   b. an optical device aligned with the mounting head for determing when the lamp's light source is in a predetermined relationship with respect to the support wires,
   c. means for adjusting the lampholder with respect to the support wires to locate the lamp's light source in a predetermined position with respect to the support wires,
   d. an attaching means for connecting the support wires to the lamp's lead wires to form a lamp mount after the lamp's light source is in the predetermined position with respect to the support wires,
   e. a mount holding fixture to securely hold the assembled lamp mount at predetermined points on the support wires,
   f. an alignment fixture for holding a reflector in an accurate predetermined position,
   g. means on the alignment fixture for receiving and accurately fixing the position of the mount holding fixture to cause the light source of the lamp to be arranged in definite predetermined relationship to the optical focus of the reflector section and cause the outer end portions of the support wires to be disposed within the reflector terminals, and
   h. means for attaching the ends of the support wires with the thimble-like terminals of the reflector section after the lamp's light source has been aligned with the reflector's optical focus.

2. The apparatus as claimed in claim 1 wherein the fixed support wire holder is a housing with grooves therein for recieving the support wires and a pair of jaws for holding the support wires within the groove, the housing also having a plate perpendicular to the grooves for making contact with a bend on the support wires, the support wire holder preventing movement of the support wires in two directions.

3. The apparatus as claimed in claim 2 wherein the means for adjusting the lampholder is a block having two directional slide adjusters mounted on an adjustable spindle.

4. The apparatus as claimed in claim 2 wherein the mount holding fixture has spring tension fingers and a recessed surface to hold the support wires.

5. The apparatus as claimed in claim 1 wherein the optical apparatus has two beams of light at approximate right angles to each other which pass through the light source of the lamp for projection on a screen.

6. The apparatus as claimed in claim 5 wherein the optical apparatus has two beams of light which strike the light source at approximately 45° angles.

7. A method of aligning a lamp mount having bent support wires fastened to leads of a lamp within a reflector so that the lamp is located at a selected optical focus of the reflector comprising the steps
   a. gripping said support wires for axial rotation with the bent portions resting on a reference surface,
   b. adjusting the lamp to predetermined position with respect to said support wires with the lamp leads engaging and rotating said support wires as necessary to make contact with said wires,
   c. fastening said lamp leads to said support wires to form an assembled lamp mount,
   d. placing said lamp mount within a reflector to bring said lamp to the selected optical focus,
   e. and securing said lamp mount in said reflector.

8. A method according to claim 7 of aligning the lamp mount within a reflector having contact ferrules extending from openings in the reflector in which placing of the lamp mount within the reflector extends the support wires through said openings into the ferrules and the wires are electrically connected to the ferrules.

9. A method according to claim 7 in which the position of the reflector is adjusted with respect to the lamp mount to bring the lamp to the selected optical focus.

* * * * *